US012689204B2

(12) United States Patent
Hartwig et al.

(10) Patent No.: US 12,689,204 B2
(45) Date of Patent: Jul. 21, 2026

(54) CABLE JOINT FOR SUPERCONDUCTING CABLES AND RELATED TECHNIQUES

(71) Applicants:Massachusetts Institute of Technology, Cambridge, MA (US); Commonwealth Fusion Systems LLC, Cambridge, MA (US)

(72) Inventors: Zachary Hartwig, Jamaica Plain, MA (US); Philip Michael, Cambridge, MA (US); Brandon N. Sorbom, Cambridge, MA (US); James Irby, Natick, MA (US); Rui Vieira, Billerica, MA (US); William Beck, Watertown, MA (US); Erica Salazar, Somerville, MA (US); Vincent Fry, Waltham, MA (US)

( * ) Notice: Subject to any disclaimer, the term of this patent is extended or adjusted under 35 U.S.C. 154(b) by 411 days.

(21) Appl. No.: 17/777,488

(22) PCT Filed: Dec. 2, 2020

(86) PCT No.: PCT/US2020/062793
§ 371 (c)(1),
(2) Date: May 17, 2022

(87) PCT Pub. No.: WO2021/113291
PCT Pub. Date: Jun. 10, 2021

(65) Prior Publication Data
US 2023/0361549 A1 Nov. 9, 2023

Related U.S. Application Data

(60) Provisional application No. 63/032,281, filed on May 29, 2020, provisional application No. 62/944,627, filed on Dec. 6, 2019.

(51) Int. Cl.
*H01R 4/68* (2006.01)
*H01B 12/00* (2006.01)
(Continued)

(52) U.S. Cl.
CPC ............. *H02G 15/34* (2013.01); *H01B 12/02* (2013.01); *H01R 4/46* (2013.01); *H01R 4/68* (2013.01); *H01R 43/04* (2013.01); *H01R 43/027* (2013.01)

(58) Field of Classification Search
CPC ........ H02G 15/34; H01B 12/02; H01B 12/00; H01R 4/46; H01R 4/68; H01R 43/04; Y02E 40/60
See application file for complete search history.

(56) References Cited

U.S. PATENT DOCUMENTS

| | | | |
|---|---|---|---|
| 2,309,607 A | 1/1943 | Rogoff | |
| 5,051,397 A | * 9/1991 | Sato | H10N 60/80 |
| | | | 505/703 |

(Continued)

FOREIGN PATENT DOCUMENTS

| | | | |
|---|---|---|---|
| CN | 106911014 | 6/2017 | |
| CN | 107104293 A | * 8/2017 | |

(Continued)

OTHER PUBLICATIONS

Superconducting cable connection (Year: 2017).*

(Continued)

*Primary Examiner* — Ishwarbhai B Patel
(74) *Attorney, Agent, or Firm* — Daly Crowley Mofford & Durkee, LLP

(57) ABSTRACT

Described are cable joints and related structures and techniques for coupling high temperature superconducting (HTS) cables. A cable joint includes a conductive member having a length which defines the length of the joint and having first and second mounting regions shaped to accept first and second HTS cable with an interface layer comprised (Continued)

of a malleable metal disposed between a surfaces of the first and second mounting regions and surfaces of the first and second HTS cables.

14 Claims, 8 Drawing Sheets

(51) Int. Cl.
| | |
|---|---|
| *H01B 12/02* | (2006.01) |
| *H01R 4/46* | (2006.01) |
| *H01R 43/02* | (2006.01) |
| *H01R 43/04* | (2006.01) |
| *H02G 15/34* | (2006.01) |
| *H01R 43/027* | (2006.01) |

(56) References Cited

U.S. PATENT DOCUMENTS

| | | | |
|---|---|---|---|
| 9,941,032 B2 | 4/2018 | Jin et al. | |
| 10,868,372 B2 | 12/2020 | Huang et al. | |
| 2010/0099570 A1* | 4/2010 | Takayasu | H01B 12/02 |
| | | | 505/231 |
| 2016/0141079 A1* | 5/2016 | Radovinsky | H01R 13/5219 |
| | | | 174/15.5 |
| 2016/0240297 A1 | 8/2016 | Iwasa | |
| 2018/0226730 A1* | 8/2018 | Fietz | H01R 4/187 |
| 2020/0005968 A1 | 1/2020 | van der Laan | |
| 2020/0028061 A1 | 1/2020 | Nakai et al. | |
| 2020/0059017 A1* | 2/2020 | Huang | H01R 4/68 |
| 2021/0083406 A1* | 3/2021 | Lu | H01R 43/02 |
| 2021/0375507 A1* | 12/2021 | Estrada | H01R 4/68 |
| 2021/0376498 A1 | 12/2021 | Craighill et al. | |

FOREIGN PATENT DOCUMENTS

| | | |
|---|---|---|
| CN | 109148074 | 1/2019 |
| FR | 1585965 | 2/1970 |
| JP | S 57194467 | 11/1982 |
| JP | H 0439875 | 2/1992 |
| JP | 2005310507 | 11/2005 |
| WO | WO 2015/129272 | 9/2015 |
| WO | WO 2018/181561 | 10/2018 |
| WO | WO 2021/257145 64 | 12/2021 |

OTHER PUBLICATIONS

Japanese Office Action (with English Translation) dated Jan. 5, 2024 for Japanese Patent Application No. 2022-533433; 6 pages.

Response (with Amended Claims in English) to Japanese Office Action dated Jan. 5, 2024 for Japanese Patent Application No. 2022-533433; Response filed Apr. 11, 2024; 9 pages.

Bykovsky, et al.; "Damage Investigations in the HTS Cable Prototype After the Cycling Test in Edipo"; IEEE Transactions on Applied Superconductivity; vol. 28; No. 4; Jun. 2018; 5 Pages.

Goyal, et al. "High critical current density superconducting tapes by epitaxial deposition of $YBa_2Cu_3O_x$ thick films on biaxially textured metals"; Applied Physics Letters 69 (12); pp. 1795-1797; Sep. 1996; 3 Pages.

Markiewicz, et al.; "Design of a Superconducting 32 T Magnet with REBCO High Field Coils"; IEEE Transactions on Applied Superconductivity; vol. 22; No. 3; Jun. 2012; 4 Pages.

Mei, et al.; "Effects of Cooling Rate on Mechanical Properties of Near-Eutectic Tin-Lead Solder Joints"; Journal of Electronic Materials; vol. 20; No. 8; pp. 599-608; Jan. 1991; 10 Pages.

Prasad, et al.; "Fabrication of new joints for SST-1 Tf coil winding packs"; Fusion Engineering and Design 88; pp. 2945-2949; Jan. 2013; 5 Pages.

Search Report and Written Opinion of the ISA dated Mar. 17, 2021 for International Application No. PCT/US2020/062793; 15 Pages.

Takayasu, et al.; "Cabling Method for High Current Conductors Made of HTS Tapes"; IEEE Transactions on Applied Superconductivity; vol. 21; No. 3; pp. 2340-2344; Jun. 2011; 5 Pages.

Tsui, et al.; "Soldered joints—an essential component of demountable high temperature superconducting fusion magnets"; Superconductor Science and Technology 29; Jan. 2016; 16 Pages.

Uglietti, et al.; "Progressing in cable-in-conduit for fusion magnets: from ITER to low cost, high performance DEMO"; Superconductor Science and Technology 31; Jan. 2018; 10 Pages.

Usoskin, et al.; "Large Area YBCO-Coated Stainless Steel Tapes With High Critical Currents"; IEEE Transactions on Applied Superconductivity; vol. 13; No. 2; pp. 2452-2457; Jun. 2003; 6 Pages.

Van der Laan, et al.; "Status of CORC® cables and wires for use in high-field magnets and power systems a decade after their introduction"; Superconductor Science and Technology; 32; Feb. 12, 2019; 34 Pages.

Haight, et al.; "Re-Makeable Joint With Insulation for REBCO Superconductor Cables"; IEEE Transaction on Applied Superconductivity; vol. 29; No. 5; Aug. 2019; 5 Pages.

Imagawa, et al.; "Test of ITER-TF Joint Sample With NIFS Test Facilities"; IEEE Transactions on Applied Superconductivity; vol. 28; No. 3; Apr. 2018; 5 Pages.

Maeda, et al.; "The MIRAI Program and the New Super-High Field NMR Initiative and Its Relevance to the Development of Superconducting Joints in Japan"; IEEE Transactions on Applied Superconductivity; vol. 29; No. 5; Aug. 2019; 9 Pages.

Martovetsky, et al.; "Qualification of the Joints for the ITER Central Solenoid"; IEEE Transactions on Applied Superconductivity; vol. 22; No. 3; Jun. 2012; 4 Pages.

Takahashi, et al.; "Development of ITER-CS model coil terminal assembling by using indium wires"; Fusion Engineering and Design 58-59; pp. 93-97; Jan. 2001; 5 Pages.

Yao, et al.; "R&D Activities of Joint Manufacture for ITER Poloidal Field Coil"; Plasma Science and Technology; vol. 17; No. 7; Jul. 2015; 6 Pages.

International Preliminary Report on Patentability dated Jun. 16, 2022 for International Application No. PCT/US2020/062793; 9 Pages.

Response to Comm. Rule 161/162 dated Jul. 13, 2022, filed on Dec. 1, 2022 for International Application No. 20829242.5; 22 Pages.

Japanese Office Action dated May 9, 2023 for Japanese Application No. JP 2022-533433 with English Translation; 6 Pages.

Response (w/ English translation of amended Claims) to Japanese Office Action dated May 9, 2023 for Japanese Application No. JP 2022-533433, filed on Jul. 19, 2023; 8 Pages.

U.S. Non-Final Office Action dated Jun. 23, 2023 for U.S. Appl. No. 17/333,314; 9 Pages.

Restriction Requirement dated Mar. 30, 2023 for U.S. Appl. No. 17/333,314; 5 Pages.

Response to Restriction Requirement dated Mar. 30, 2023 for U.S. Appl. No. 17/333,314, filed May 30, 2023; 2 Pages.

Restriction Requirement dated Jun. 16, 2023 for U.S. Appl. No. 17/333,311; 5 Pages.

Response to Restriction Requirement dated Jun. 16, 2023 for U.S. Appl. No. 17/333,311 as filed on Aug. 16, 2023; 1 Page.

Japanese Office Action dated Aug. 28, 2023 for JP Application No. 2022-533433; 5 Pages.

Notice of Allowance dated Oct. 6, 2023 for U.S. Appl. No. 17/333,314; 11 Pages.

Office Action dated Sep. 28, 2023 for U.S. Appl. No. 17/333,311; 12 Pages.

Korean Notice of Allowance (with English translation of Allowed Claims) dated Nov. 5, 2024 for Korean Patent Application No. 10-2022-7020707; 8 pages.

\* cited by examiner

CABLE JOINT FOR SUPERCONDUCTING CABLES AND RELATED TECHNIQUES

CROSS REFERENCE TO RELATED APPLICATION

This application is a U.S. National Stage of International Application PCT/US2020/062793 filed in the English language on Dec. 2, 2020 and entitled "CABLE JOINT FOR SUPERCONDUCTING CABLES AND RELATED TECHNIQUES", which claims the benefit of U.S. Provisional Application 63/032,281 filed May 29, 2020 and U.S. Provisional Application 62/944,627 filed Dec. 6, 2019. The contents of the above-referenced applications are hereby incorporated by reference as if fully set forth herein.

BACKGROUND

Cable joints for use with high temperature superconductor (HTS) cables may utilize HTS tape-to-tape connections within the cables or joint region. With such an approach, each HTS tape within the cables must be specially prepared (e.g. measured, cut, soldered or pressed, etc.) onto a neighboring HTS tape so as to join one HTS tape to another. Attempts are made to carefully ensure each tape pair has identical contact resistance to ensure uniform current distribution within the joint region. These processes are extremely slow, tedious, complex, and error-prone. Thus, such processes do not scale to high-throughput production of HTS cables required at the large research or industrial scale.

One joint concept for a 100-kA class cable envisioned by the National Institute of Fusion Sciences in Japan utilizes a stair-stepped (or staircase) configuration of HTS tapes for either side of a joint with a top piece that is clamped down over two bottom sections with indium film in between. Although these joints have demonstrated low resistances at low magnetic fields, they are very long (in some cases, almost one (1) meter) and the staircase geometry is complex. In addition, once the indium film is pressed to bare HTS tapes, it is difficult to separate such a structure thereby making it difficult to open up (or "demount" or "disengage") the joint formed by pressing together the tapes.

SUMMARY

Described are structures and related techniques for coupling or joining a superconducting cable to at least one other conductor which may be a superconductor or a normal conductor (i.e. a non-superconducting conductor). In embodiments, the superconducting cable may be a high temperature superconducting (HTS) cable. The described structures and techniques may be utilized as part of and/or to form "cable joints" (or more simply "joints"). Described joint embodiments may provide one or more advantages over prior art joints for coupling superconducting cables including but not limited to: the ability to demount and remount a superconducting cable; joint lengths which are shorter than conventional joint lengths for the same or a similar application; simple manufacturability relative to prior art approaches; low cost relative to prior art approaches; increased reliability relative to prior art approaches; and increased robustness relative to prior art approaches.

A complete cable joint comprises a conductive joining member (or "joining member" or "conductive member") and means for securing a superconducting cable to the joining member. In embodiments, the means for securing may be provided as a clamp structure (e.g. a clamp bolted or otherwise coupled to the superconducting cable and the joining means).

In embodiments, structures provided in accordance with the concepts described herein may be used to couple one superconducting cable to another cable (which may or may not be a superconducting cable) to thus form a cable-to-cable joint. In embodiments, cable-to-cable joints (also referred-to herein as "cable joints" or more simply "joints") between HTS cables may be realized by disposing the HTS cables on mounting regions of a conductive member. In embodiments, the HTS cables are disposed in mounting regions located on opposing sides of the conductive member. In embodiments, cable-to-cable joints between round, copper-jacketed HTS cables are realized by compressing the HTS cables on either side of form-fitting mounting regions of the conductive member (i.e. the mounting regions having a shape selected to match the shape of the copper-jacketed HTS cables). With this approach, only a few very simple and limited processing steps are required to create the joint after fabrication of a superconducting cable. The complete joint includes means for securing the superconducting cable in the mounting region of the conductive member. In embodiments, the means may be a clamp bolted or otherwise secured about the cables to be joined and the conductive member.

In embodiments, a malleable conductive material may be disposed on surfaces of conductive member mounting regions and cables are compressed in the mounting regions via one or more clamps. In embodiments, the conductive material may be provided as an indium wire. In embodiments, the clamps may be external to the conductive member. In embodiments in which the superconducting cables to be joined comprise HTS tapes or HTS tape stacks, little or in some instances no preparation of the HTS tapes or HTS tape stacks beyond the original cable fabrication process is required. Cables may be de-mounted by loosening or removing the clamps. To re-use the conductive member, the conductive material may be removed (e.g. cleaned by scrubbing e.g. with a brush) or other mechanical technique or by application of a cleaning fluid or paste or by a combination of cleaning fluid/paste and mechanical cleaning. Thus, with this approach the cable joints are fully demountable and reusable with a small amount of effort and tooling. The use of such demountable and re-mountable joints makes possible the design and fabrication of practical HTS magnets that are fully demountable.

In embodiments, a joint preparation process may be as follows: (a) determining a joint length based upon application requirements; (b) producing a conductive member having at least two mounting regions, each of which has a shape selected to accept a conductor and having a length equal to the joint length. In embodiments in which two round HTS cables are being joined (i.e. HTS cables having a circular cross section), the conductive member may be provided having a so-called double saddle shape with mounting regions having radii for accepting conductive cable jackets of the HTS cables. The process may optionally include (c) removing contaminants (e.g. oxides and any other contaminants) from those portions of the cable which will be in contact with the mounting regions of the conductive members. This may be accomplished, for example, by rubbing (e.g. sanding) portions of the cable with an abrasive material (e.g. sanding the jacket) or by lapping portions of the cable that will be in contact with the mounting regions of the conductive members. This cleans those portions of the cable which will be in contact with the mounting regions of the conductive members and also increases (an ideally maximizes) surface area contact to ensure a low amount of (and ideally, minimal) resistivity from the interfaces between the cables and the surfaces of the mounting regions. The process may further optionally include (d) plating the jacket of the superconducting cable and the corresponding mounting regions within the conductive member. The process may also optionally include (e) disposing a malleable conductive material (e.g. indium) into the mounting region(s) of the conductive member to increase (and ideally maximize) surface area for electrical contact between the cable surfaces and mounting region surfaces to reduce (and ideally minimize) electrical resistance. It should be noted that unless otherwise impractical, the above elements (a)-(c) may be performed in any convenient order.

In embodiments, cables may be compressed or otherwise disposed into the mounting regions of the conductive member with sufficient pressure to ensure the malleable conductive material forms a continuous and contiguous layer disposed between the surface of the mounting area and a surface of the HTS cable to thus ensure electrical and mechanical contact between the HTS cables and the conductive member. This may be accomplished using any means including any clamping means or any bolting structure to hold or otherwise secure the HTS cables to the mounting regions of the conductive member. In embodiments, two HTS cables may be compressed into a conductive double saddle, using a bolting structure capable of providing sufficient pressure to ensure mechanical and electrical contact between the cables and double saddle. In embodiments a press fit or an interference fit between a cable portion and a mounting region may be used.

In embodiments, a pair of HTS cables having an external jacket and an internal jacket may be joined. In such an embodiment, the external jacket portion of the HTS cable is removed such that the internal jacket of the HTS cable is disposed in the mounting region of the conductive member. Thus, unlike prior art joints for coupling HTS cables, portions of the cables themselves (e.g. cable portions within the external jacket) form a portion of the joint. Other than cleaning processes, no mechanical processing of cable components (i.e. cable portions within an external jacket) is required. In particular, in the case of a superconducting cable comprising an HTS material (e.g. an HTS tape), no processing of the HTS material is required after the superconducting cable has been fabricated.

Thus, described herein is a joint which enables connections between, for example, two superconducting cables (e.g. two HTS cables) or between a superconducting cable and a normal conductor. For example, a joint provided in accordance with the concepts described herein may be used to enable connections between two superconducting cables or between a superconducting conductor and a power supply terminal.

Joints provided in accordance with the concepts described herein allow "demounting" and "remounting" of superconducting and/or normal conductor structures (e.g. superconductor and/or normal cables). Such a characteristic may be useful, for example, in the case of re-usable test fixtures or HTS magnets where it is advantageous to disassemble an HTS magnet during the life of the magnet.

Furthermore, joints provided in accordance with the concepts described herein may be provided having a length which is shorter than the lengths of conventional joints in similar applications. Shorter joint lengths may be desirable in superconducting applications, since space may be limited in superconducting applications. Also, joints provided in accordance with the concepts described herein are relatively simple, easier to manufacture and cost less than conventional joints for joining superconducting cables such as HTS cables.

The foregoing summary is provided by way of illustration and is not intended to be limiting.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

Although reference is sometimes made herein to specific cable joint configurations, it is recognized that many variations are possible. Such variations are understood to be within the scope of this disclosure. Also, reference is sometimes made herein to a particular type of superconducting cable (e.g. a particular type of superconducting cable geometry). Although reference is sometimes made to a particular superconducting cable geometry, those of ordinary skill in the art will appreciate that the joint structures and techniques described herein may find use with any type of superconducting cable including superconducting cables having any geometry or provided from any technique. After reading the disclosure provided herein, one of ordinary skill in the art will understand how to make any appropriate joint modifications needed to accommodate a particular type of superconducting cable or a particular type of superconducting cable geometry or configuration.

Figure 1:
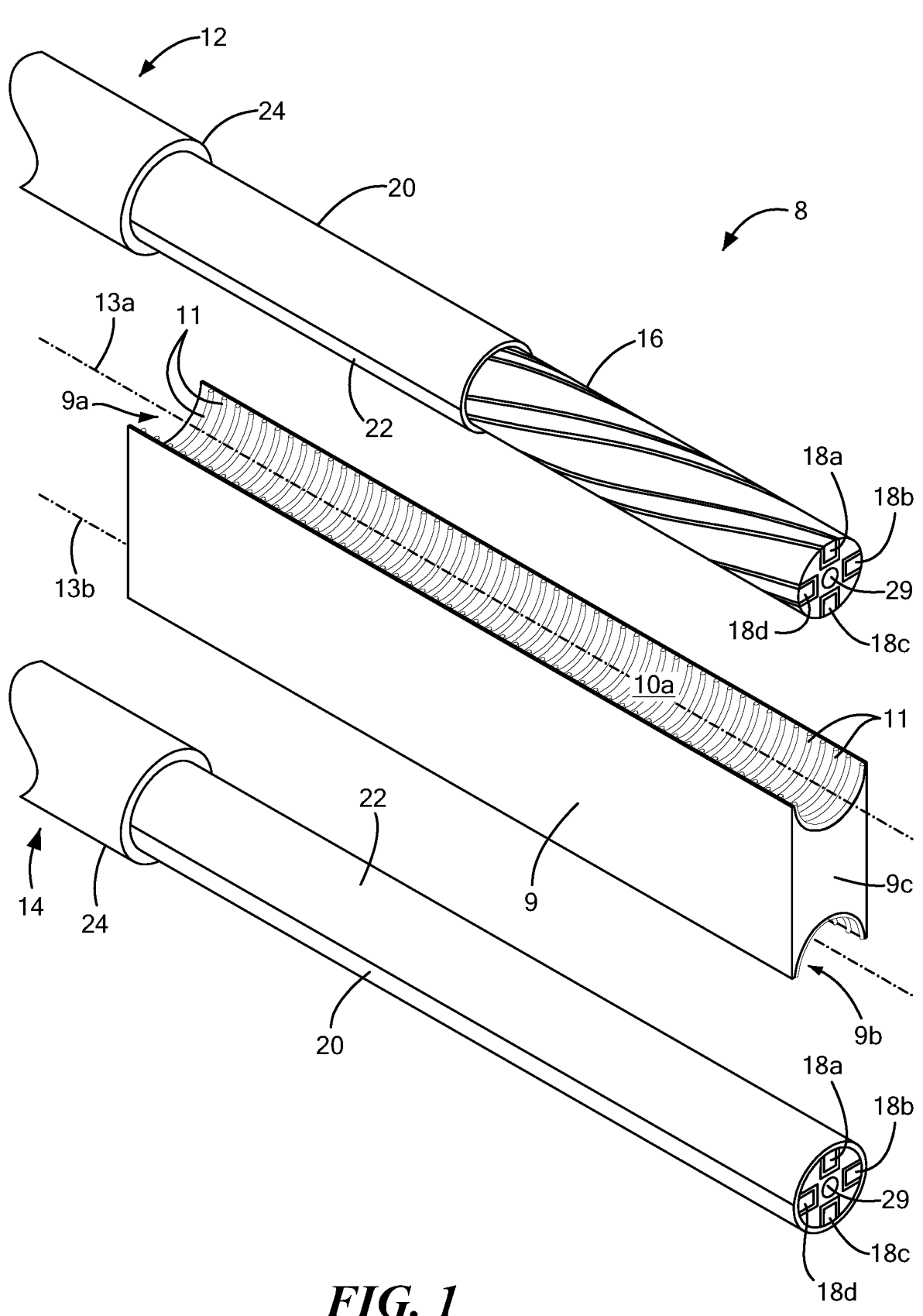
FIG. 1 is an exploded perspective view of two high temperature superconducting (HTS) cables coupled by a cable joint.
Figure 2:
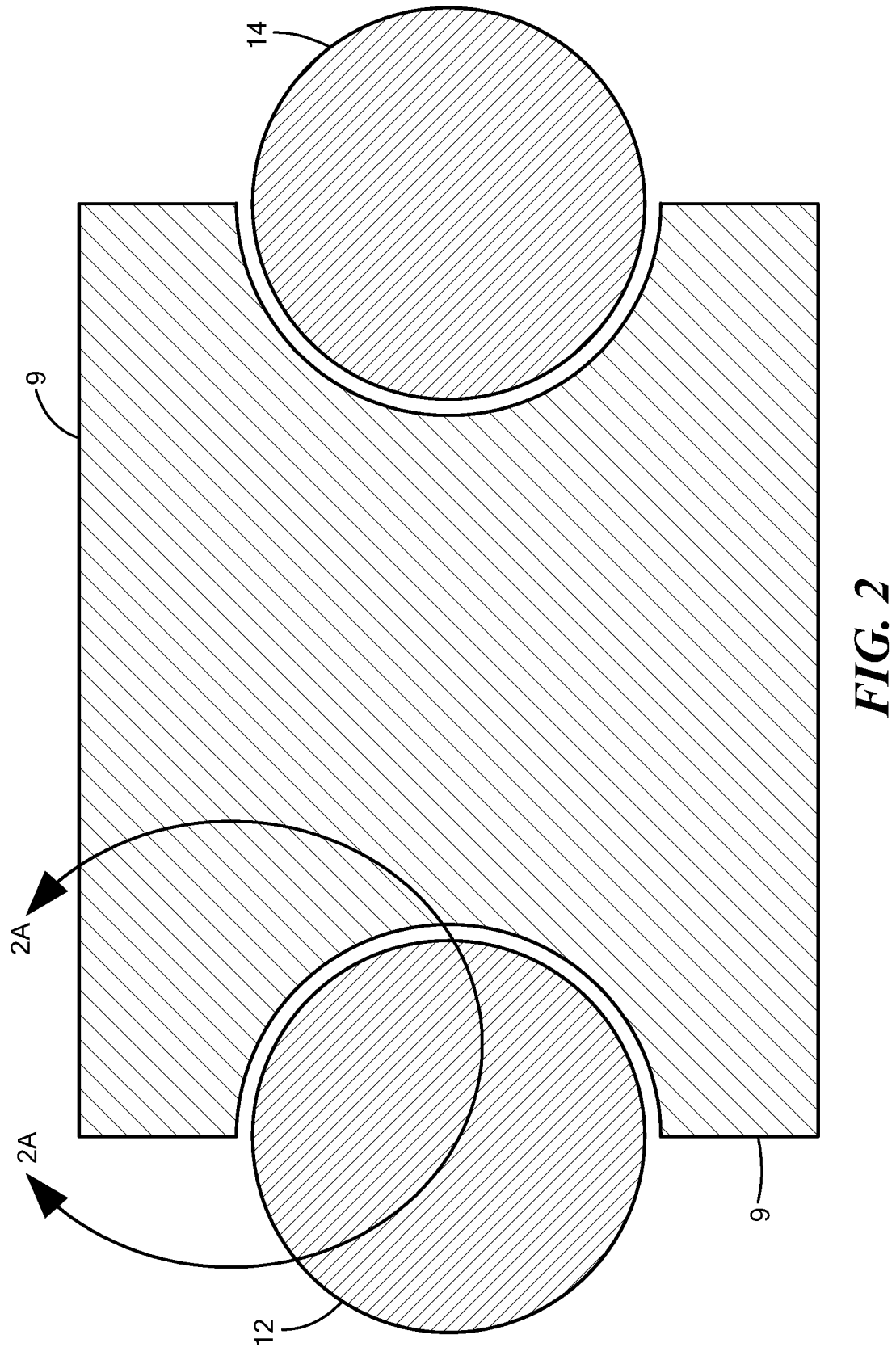
FIG. 2 is a cross-sectional view of a cable joint conductive joining member having two superconducting cables coupled thereto.
Figure 2A:
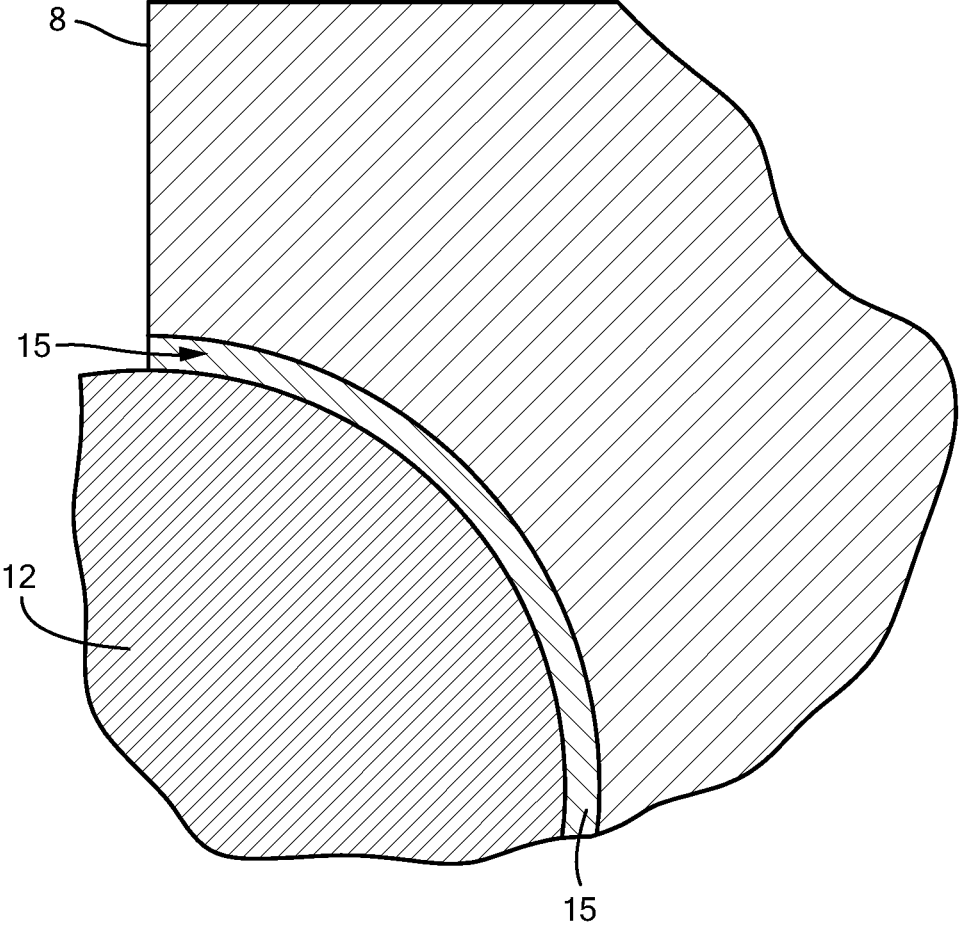
FIG. 2A is an enlarged cross-sectional view of a portion of the conductive joining member cable joint and superconducting cable taken along lines 2A-2A of FIG. 2.

Referring now to FIGS. 1-2A in which like elements are provided having like reference designations throughout the several views, a joint 8 has a main body 9 (also referred to as a conductive joining member, also sometimes referred to as a "conductive member" or a "joining member") having conductor mounting regions 9a, 9b on opposing sides thereof.

Although mounting regions 9a, 9b are herein shown on opposing sides of conductive member 9 with central longitudinal axes 13a, 13b thereof aligned, those of ordinary skill in the art will appreciate that mounting regions 9a, 9b can be oriented in positions different from the positions illustrated in FIG. 1. For example, in embodiments, it may be desirable or even necessary to provide conductive member 9 having a shape such that mounting regions 9a, 9b are on opposite sides but offset from each other (i.e. the central longitudinal axes 13a, 13b are not aligned as illustrated in FIG. 1) or mounting regions 9a, 9b may be provided at an angle (e.g. a 90 angle) with respect to each other (e.g. mounting region axes may be orthogonal). Other variants are also possible. For example, the mounting regions may be on the same surface of conductive member (e.g. the mounting regions may be side-by-side on the same surface of the conductive member). The particular location, orientation and shape of the mounting regions in conductive member 9 is selected to meet the needs of a particular application.

Thus, in embodiments, the cables need not be axially symmetrical. In embodiments, the cables may be oriented axially in either direction. In the illustrative embodiment of FIG. 1, a so-called "praying hands" configuration is shown, but flipping one cable (e.g. cable 12) 180 degrees with respect to a second cable (e.g. cable 14) results in a joint having a so-called "shaking hands" configuration (see FIG. 1C). In short, the mounting regions 9a, 9b may be oriented in any manner to accept cables oriented anywhere between 0 and 180 degrees with respect to each (e.g. a central longitudinal axes of each cable may be oriented anywhere between 0 and 180 degrees with respect to each other). Furthermore, it is appreciated that mounting regions 9a, 9b (and thus conductive member 8) may be configured to accept cables which are not straight. That is, the cables and mounting surfaces of conductive member 9 could follow a curved path or an irregularly shaped path along a length thereof.

Mounting regions 9a, 9b have associated mounting surfaces 10a, 10b (with only mounting region 10a being visible in FIG. 1). In this illustrative embodiment, mounting regions 9a, 9b are provided as C-shaped voids or C-shaped regions in conductive member 9 to thus provide joint 8 having a so-called "double-saddle" shape. Thus, conductive member 9 is sometimes referred to as a "saddle member" or a "saddle piece").

At least the particular cross-sectional shape, length, and configuration (e.g. path along the mounting region length) of mounting regions 9a, 9b are selected to match the shape of a conductor (e.g. conductors 12, 14) with which the conductive member 9 is intended to interface. Thus, while in this example mounting regions 9a, 9b of conductive member 9 are straight (i.e. a straight path along its length) are intended to interface with straight conductors 12, 14 (i.e. a conductor having a straight path length) having a generally circular, or semi-circular, cross-sectional shape, it should be appreciated that mounting regions 9a, 9b may be provided having any regular or any irregular geometric shape selected to substantially match a cross-sectional shape and path length shape of a conductor (e.g. curved mounting regions may be used to accept a conductor having a curved path length).

For example, mounting regions 9a, 9b may be provided having a rectangular cross-sectional shape, a square cross-sectional shape, an oval cross-sectional shape or a multi-faceted cross-sectional shape. Other geometric shapes are also possible. Also, it should be appreciated that each mounting region need not be provided having the same cross-sectional shape (i.e. each mounting region may be provided having a different cross-sectional shape so as to join, for example, cables having different cross-sectional shapes). For example, one mounting region, may have a C-shaped mounting surface as shown in FIG. 1 (so as to accept a cable such as that shown in FIGS. 1, 1A), while a second mounting region may have a flat mounting surface so as to accept a conductor having a flat surface (e.g. such as a bus bar having a rectangular cross-sectional shape).

In embodiments, saddle member 9 may be provided in whole or in part from an electrically conductive material. For example, saddle member 9 may comprise copper. One class of conductive materials which may be used includes oxygen free high conductivity (OFHC) copper. Saddle member 9 may comprise, for example, a high conductivity copper such as C101 copper, to name one specific alloy as an example. Other materials having electrical and mechanical/structural characteristics which are the same as or similar to the electrical and mechanical/structural characteristics of C101 copper may, of course, also be used including, but not limited to, alloyed coppers (for example: bronze, copper doped with silver, etc.). Other alloys (including other copper alloys) could, of course, also be used. In some applications, a tradeoff between material strength and material conductivity may be made in selecting a material. For example, in some applications it may be desirable to select a material (e.g. a copper alloy) which provides higher strength but at the expense of conductivity while in other applications it may be desirable to select a material which provides higher conductivity but at the expense of strength. After reading the disclosure provided herein, one of ordinary skill in the art will understand how to select a particular material (or materials) from which to provide conductive member 9 for a particular application.

The surfaces of the cable and/or the mounting surfaces may have defects therein (i.e. have pits or peaks) and thus may be said to be rough. Such defects may prevent or reduce the amount of surface area contact between the surfaces of the cable and the mounting region. Disposed on the mounting surfaces 10a, 10b of mounting regions 9a, 9b is a malleable conductive material 11. When conductors (e.g. cables) are disposed in the mounting regions, the malleable conductive material 11 deforms to fill in or otherwise obviate the defects to provide a continuous surface between the conductor and the mounting region. This approach increases the amount of surface area in contact between the conductor and the mounting region. Such increased surface area results in a concomitant increase in electrical conductivity the conductor and the mounting region.

In this example embodiment, conductive material 11 comprises an electrically conductive metal configured as strips or lines disposed in mounting surfaces as indicated by reference numerals 11 in FIG. 1. In embodiments, substantially pure indium wire may be placed or otherwise disposed on the mounting surfaces with a spacing between wires selected such that the wires can be deformed to form a conductive layer upon insertion of a cable in the mounting region. It should be noted that the conductive material can be placed in any orientation (i.e. lengthwise or crosswise or at any angle) within mounting regions 9a, 9b.

In embodiments, an indium wire having a diameter of about 0.031" may be used with a center-to-center spacing of in the range of about 4 mm-10 mm.

In embodiments, the wire may be wrapped around each conductor and then placed in mounting regions 9a, 9b. In embodiments, the wire may be wrapped around inner jackets (e.g. inner jackets 20 of cables 12, 14). Upon placement of the respective conductors in the mounting regions 9a, 9b the conductive material deforms to provide an electrically conductive layer (and ideally a continuous conductive layer having a substantially uniform thickness). In embodiments, an indium wire may be spiral wrapped with a 4 mm pitch around a cable. This technique holds or otherwise secures the indium in place during assembly and excess indium (i.e. those portions of the indium which are not disposed between a surface of the conductor and mounting surfaces 10a, 10b) is removed. This amount of indium, when compressed properly, results in a layer (or sheet) having a thickness of about ~0.005". Such a technique results in a consistent method for disposing a malleable, conductive material (e.g. indium) within the mounting regions and obtaining an interface layer having a substantially uniform thickness.

In embodiments, the conductive material 11 may be provided as a soft metal. For example, a metal having a malleable characteristic at room temperature (e.g. temperatures in the range of about 55 F to about 90 F) may be used. The purpose here is that the "soft metal" should be able to be handled, molded, and then squeezed tightly between the two surfaces (i.e. a surface of the conductor to be joined and mounting surfaces 10a, 10b) to form a continuous surface, preferably without a heat treatment process. For reasons which will become apparent from the description provided herein below, conductive material 11 is disposed on mounting surfaces 10a, 10b (or on conductors 12, 14) such that when conductors (e.g. cables 12, 14) are disposed in respective ones of the mounting regions 10a, 10b, the conductive material 11 is disposed between a surface of the conductor (e.g. an HTS cable) and a surface of the mounting regions. As used herein the phrase "HTS materials" or "HTS superconductors" refer to superconducting materials having a critical temperature above 30 K at self-field.

In embodiments, a metal capable of deforming to provide a substantially uniform metal layer (and ideally a highly uniform metal layer) on a mounting surface of the mounting region is preferred. Such a substantially uniform deformation and resulting layer results in a substantially uniform contact between a surface of a conductor disposed in the mounting region and a surface of the mounting region. It should, however, be appreciated that in embodiments a substantially uniform layer thickness is not necessarily needed since total joint resistance does not directly depend greatly upon the thickness or the layer. It is, however, desirable that all of the wires (e.g. indium wires) deform in a manner which results in no gaps between the deformed wires (i.e. after wire deformation, the resulting metal should be contiguous and ideally cover the entire mounting surfaces). Thus, it is desirable to have a continuous, uninterrupted sheet or interface layer (e.g. interface layer 15 of FIG. 2A) of a conductive material (e.g. indium) at the end of the process to ensure a large (and ideally the largest) contact area between a surface of the conductor and mounting surfaces 10a, 10b and low oxidation.

The particular amount of pressure to use to deform the conductive materials depends upon a variety of factors including, but not limited to the materials from which the cable, saddle member and conductive material are provided in addition to the size (e.g. diameter, cross-sectional area, etc. . . . ) and configuration of the conductors being joined.

Furthermore, conductive metal 11 may be provided having any shape. For example, conductive metal 11 may be provided as one or more wires as shown in FIG. 1. The wires may be provided having any regular or irregular cross-sectional shape including, but not limited to oval, circular, rectangular, square, triangular or any other cross-sectional shape. Alternatively, conductive metal 11 may be provided in the form of (or as a type of) a conductive paste or a conductive liquid metal. The particular type and shape of conductive metal 11 to use is selected such that a substantially contiguous and substantially continuous contact layer exists between the conductor (e.g. one of cables 12, 14) and mounting surface.

In embodiments, the metal 11 may be provided as indium. In embodiments, the metal 11 may be provided as an indium wire. Since indium is a soft metal at room temperature, it deforms to provide a uniform substantially, and thus low resistivity, contact layer between a surface of the HTS conductor and surfaces 10a, 10b of the saddle member 9.

A metal which deforms to allow such a contact layer (such as layer 15 in FIG. 2A) results in a low resistivity path (e.g. a path having a resistance on the order of a nano-ohm) between the cable and saddle member 9. In principle, resistance of the joint will decrease approximately linearly with the available area through which the current can flow. Thus, it is desirable to cover as much of the mounting region surface area which will be in contact with the conductor to be joined as is practically possible. Ideally, once the cable to be joined is disposed in the mounting region, the interface layer 15 covers the entire surface area of the mounting region.

In embodiments, conductive metal 11 could be disposed or applied (or spread) over the mounting surface of the cable rather than the mounting surfaces of the conductive member (e.g. the saddle member). In embodiments, conductive metal 11 could be disposed or applied (or spread) over portions of both the mounting surface of the cable and the mounting surfaces of the conductive member (e.g. the saddle member). In embodiments, it may be necessary to heat the cable and/or the mounting surface to promote or facilitate the deformation characteristic of the metal which forms the conductive interface layer.

In this example embodiment, a pair of superconducting cables 12, 14 (each having a generally circular or semi-circular cross-sectional shape) are disposed on respective ones of mounting surfaces 10a, 10b. Thus, in this example, joint 8 is disposed between the two superconducting cables 12, 14.

In the example embodiment of FIG. 1, superconducting cables 12, 14 may correspond to high temperature superconductor (HTS) cables.

Figure 1A:
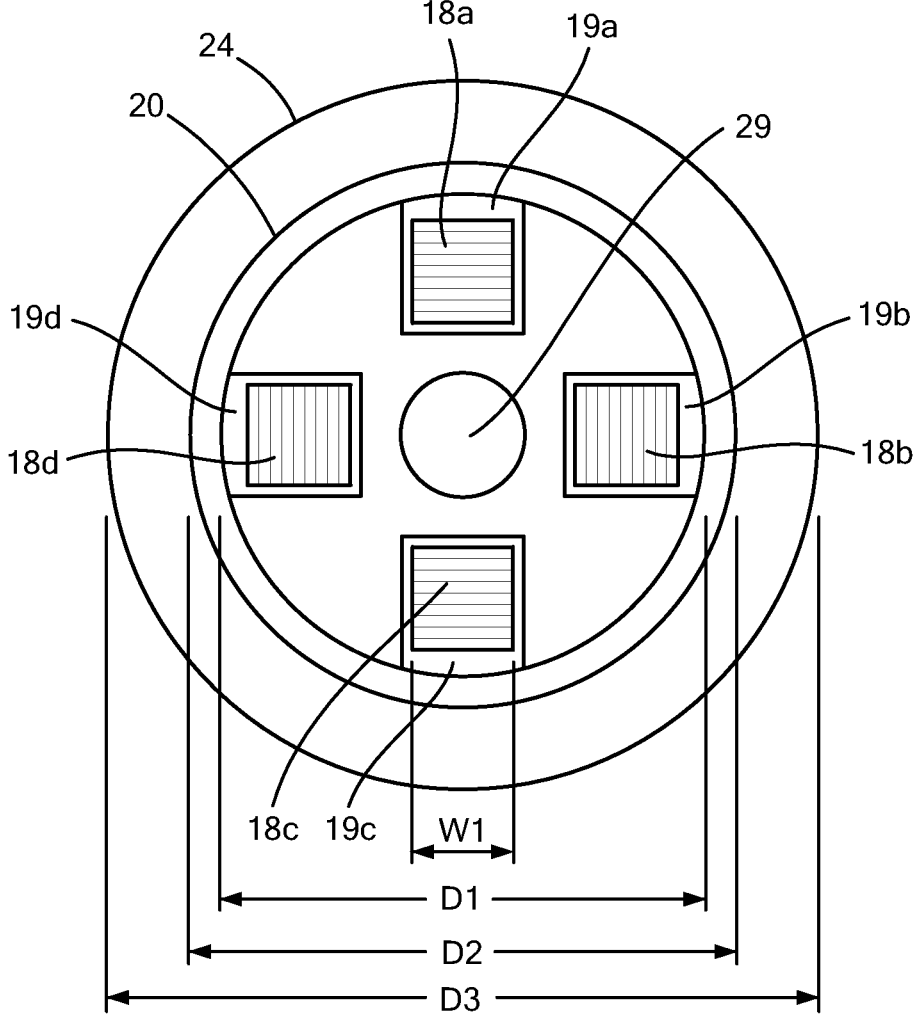
FIG. 1A is an end view of a cable which may be the same as or similar to one of the superconducting cables shown in FIG. 1.
Figure 1B:
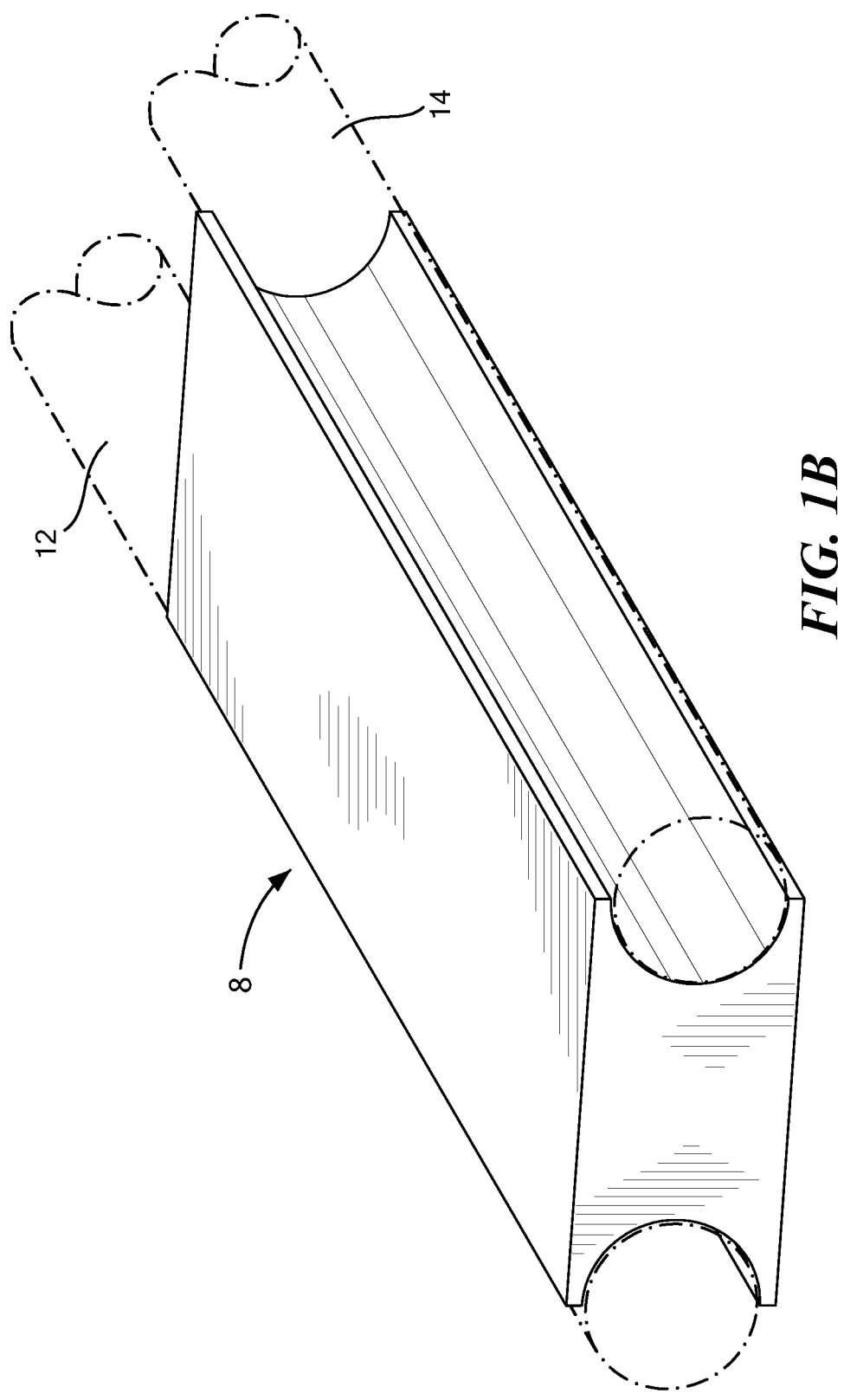
FIG. 1B is a perspective view of a conductive joining member, which may be the same as or similar to the conductive joining member of FIG. 1, having cables coupled thereto in a so-called "praying hands" configuration.

As may be most clearly seen in FIG. 1A, and taking cable 12 as representative of cable 14, cable 12 comprises a former 16 having HTS tapes 18a-18d disposed in channels provided in the former 16. HTS tapes 18a-18d are held in their respective channels via solder 19a-19d. An inner jacket 20 (e.g. a copper jacket) is disposed around the former and HT tapes and a plating 22 (e.g. a silver plating) may be disposed over the inner jacket 20. Although the entire surface of inner jacket 20 may be plated, in embodiments, only the surface portion of inner jacket 20 which will be disposed in the mounting region need be plated. Thus, as illustrated in FIG. 1, only about one-half of the surface of inner jacket 20 has a plating 22 disposed thereover since only about ½ of the inner jacket will contact the mounting surface. An outer jacket 24 (e.g. a steel or stainless-steel jacket) is disposed around inner jacket 20.

In this example embodiment, the cable 12 has multiple channels in an electrically conductive (e.g. copper) former surrounded by one or more jackets. Each channel has an HTS tape stack and being filled with a metal (e.g. a solder). Cable 12 also includes an optional cooling channel 29.

As shown in FIG. 1A, the width of an illustrative channel is $W_1$, the diameter of the former is $D_1$, the diameter of an inner jacket is $D_2$, and the diameter of an outer jacket is $D_3$. In embodiments, the inner jacket may comprise copper and the outer jacket may comprise stainless steel. However, this is merely by way of example, as other suitable materials for the jackets and former may be used.

In embodiments, the superconducting cables 12, 14 (which may comprise HTS tape stacks) are pressed into the saddle member 9 such that the soft metal 11 is disposed between a surface of the superconducting cables 12, 14 and mounting surfaces 10a, 10b of the saddle member 9. Thus, in embodiments, the conductors 12, 14 may be provided as HTS cables which are pressed or otherwise disposed into respective ones of mounting regions 9a, 9b with indium therebetween.

In such embodiments, the HTS cables 12, 14 are preferably prepared prior to coupling the cables to mounting regions 9a, 9b. In embodiments, such preparation includes removing portions of outer jacket 24 to reveal underlying inner jacket 20. Surfaces of the inner jackets 20 are prepared prior to insertion of the conductors into the contact regions 9a, 9b. In embodiments, such inner jacket preparation includes cleaning the exposed inner jacket conductors. Such cleaning may be accomplished via mechanical or chemical techniques. For example, cleaning may be accomplished through lapping or very fine sanding to remove contaminates (including oxides) to thus improve conductivity (i.e. surfaces of the HTS cable copper inner jacket 20 may be prepared by lapping, sanding or other mechanical and/or chemical techniques to improve conductivity).

Once cleaned, the inner jacket may optionally be plated. In embodiments, a surface of the inner jacket may optionally be silver plated. Similarly, the mounting surfaces 10a, 10b may also be plated. The cleaning and plating processes, together with the use of metal 11, help increase (and ideally maximize) contacting surface areas and high electrical conductivity between the conductors 12, 18 and joint 8. Thus, the plated surface 20 of inner jacket 22 is disposed against metal 11 which in turn is disposed against mounting surfaces 10a, 10b.

Importantly, using the structures and techniques described herein, the joints can simply be demounted, indium stripped, and reapplied to reuse the joint. Furthermore, joints provided in accordance with the concepts, structures and techniques described may have one or more advantages relative to conventional HTS joints including but not limited to: increased reliability relative to prior art approaches (e.g. about 25 joints have been manufactured and tested with zero failures); increased robustness relative to prior art approaches (joints provided in accordance with the concepts described herein stand up against normal "wear and tear" in a magnet as a result of, for example, mechanical cycling and thermal cycling); joint lengths which are shorter than conventional joint lengths for the same or a similar application; manufacturability which is less complex relative to conventional approaches; and low cost relative to conventional prior art approaches.

Thus, illustratively, the HTS conductors 12, 14 are pressed into the conductive saddle member 9 with indium 11 therebetween. Since indium is a soft metal at room temperature, it deforms to establish an interface layer, and thus a low resistivity, contact between the HTS conductor and the saddle. The lapping, silver plating, and indium ensure large, uniform surface areas and high electrical conductivity.

Figure 1C:
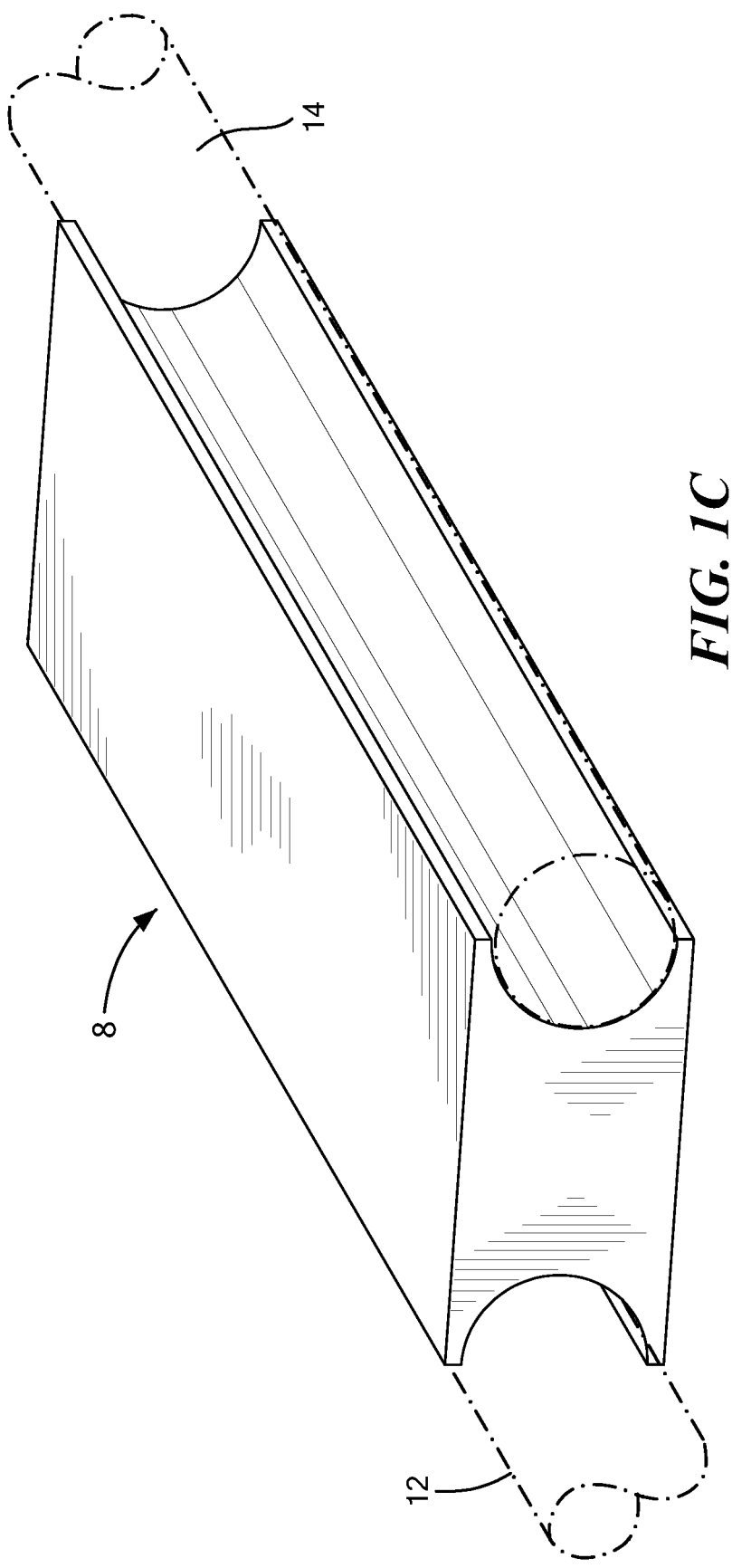
FIG. 1C is a perspective view of a conductive joining member, which may be the same as or similar to the conductive joining member of FIG. 1, having cables coupled thereto in a so-called "shaking hands" configuration.

FIG. 1C is a perspective view of a conductive member 9 having HTS cables 12, 14 coupled thereto in a so-called "shaking hands" configuration.

Figure 3:
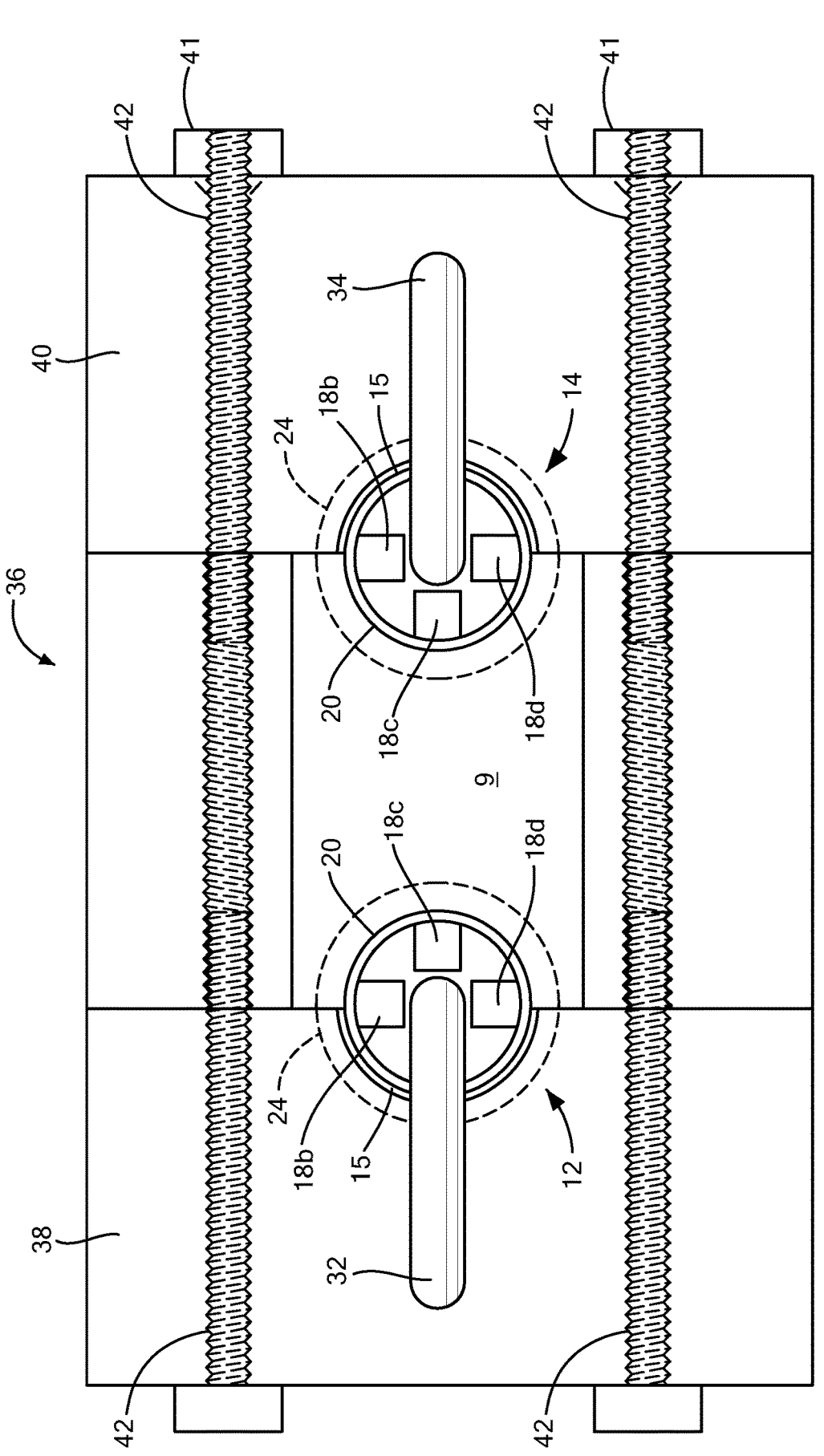
FIG. 3 is an end view of a pair of superconducting cables coupled to a cable joint.

Referring now to FIG. 3, in which like elements of FIGS. 1-2A are provided having like reference designations. A cable joint 36 comprises a conductive member 9 and a joining means. The conductive member 9 is here shown having a double-saddle shape (and thus may be referred to as a double-saddle member). Two HTS conductors 12, 14 are coupled to mounting regions of the double-saddle member via the joining means. Cooling conduits 32, 34 provide coolant to cooling channels 29 (FIGS. 1, 1A) of respective cables 12, 14.

In this illustrative embodiment, the joining means is provided as a joining structure comprising a pair of brackets 38, 40 secured or otherwise coupled about saddle member 9 and cables 12, 14 via a nut 41 and bolt 42 arrangement to form a clamping structure. In embodiments, other joining structures may, of course be used. For example, screws which couple to threaded bores in brackets may be used. Alternatively, the joining means may comprise spring-type structures. Alternatively still, in embodiments, a permanent joining means (e.g. a welded structure) may be used.

In embodiments, the brackets 38, 40 may be provided as stainless-steel brackets. In embodiments in which the two HTS cables are compressed into a conductive double saddle, any clamping or holding structure capable of providing up to 40 MPa of pressure to ensure mechanical contact between the cables and the double saddle structure may be used. The particular manner in which the joining means are implemented is not important as long as the joining means provide enough force to securely hold cables 12, 14 to conductive member 9.

Figure 4:
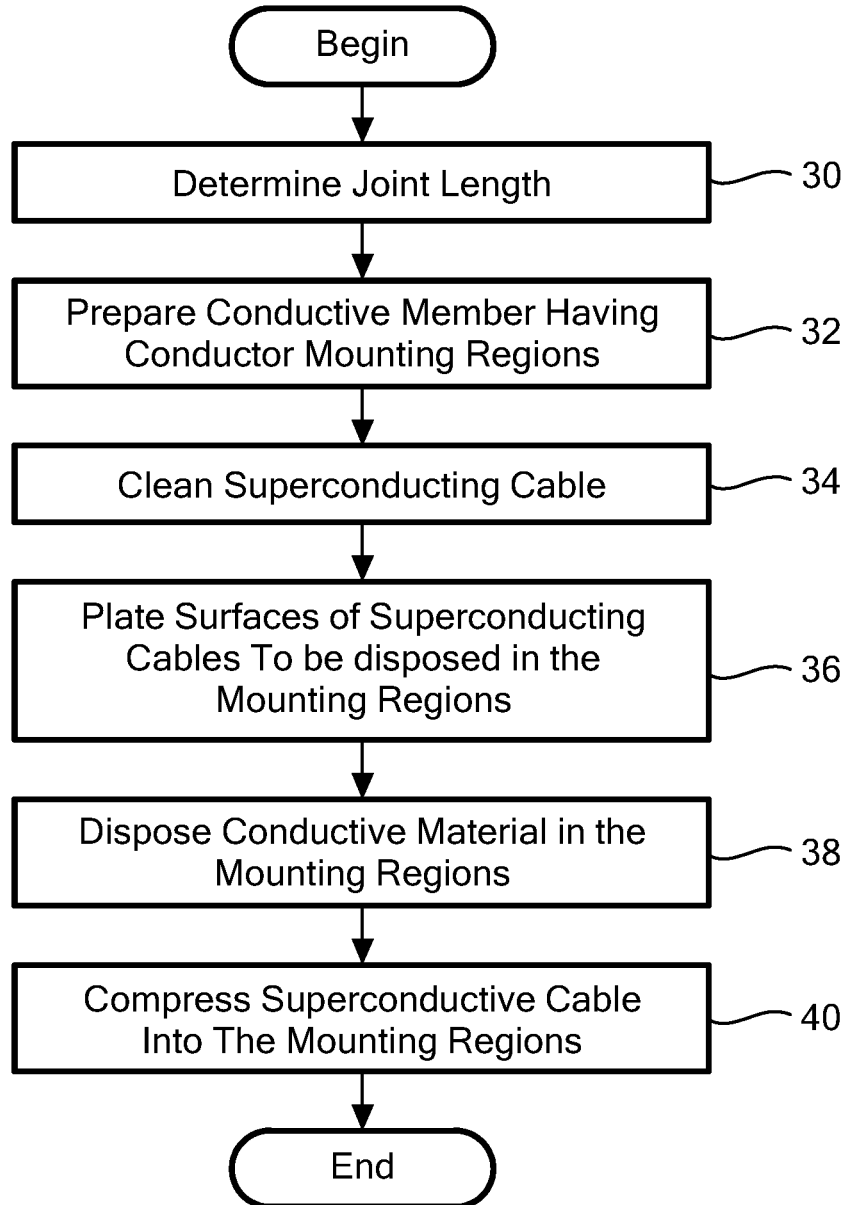
FIG. 4 is a process for preparing a superconducting cable for mounting to a cable joint.

Referring now to FIG. 4, a process for joining a superconducting cable to another conductor via a cable joint which may be the same as or similar to the cable joints described above in conjunction with FIGS. 1 and 3 may begin by selecting or otherwise determining a joint length 32. Selection or determination of a joint length may be based upon a variety of factors including, but not limited to application requirements (e.g. the available physical space), and cable design. For example, a twisted cable configuration of the type which is the same as or similar to the type shown in FIGS. 1 and 1A may require a joint length which is different than a joint length required by a non-twisted cable configuration.

In general, the longer the joint the lower the resistance of the joint. Also, the longer the joint the less cooling which is required and the greater the temperature stability of the joint. Thus, in practical systems, a tradeoff must sometimes be made between an ideal joint length and restrictions on joint length required by a particular application in which the joint will be used (e.g. physical and geometric mechanical constraints that would be difficult to avoid or which cannot be avoided in an application).

In embodiments in which a twisted HTS cable is used (e.g. as shown in FIGS. 1, 1A), it is desirable (if possible) that that joint length accommodate an integral number of twist pitches for current re-distribution reasons but it is not strictly required. One may would want a longer joint if the current density within the joint exceeds the available cooling capacity to remove the heat generated from within due to resistance of the joint.

Once a joint length is determined or otherwise selected, the process includes producing a conductive member (e.g.

conductive member 9 in FIG. 1) having the determined joint length and having suitably shaped conductor mounting regions 34. In embodiments, the conductive member may be provided having a double saddle shape (i.e. having mounting regions on opposing sides thereof and shaped to accept a cable having a circular cross-sectional shape. For example, in embodiments in which the joint couples two round cables, the mounting regions are provided having a radii for fitting such cables.

In embodiments in which the cables are provided as HTS cables having both outer and inner jackets, the radius of each mounting region is selected to accept the surface of one of the inner or outer jacket which will be disposed in the mounting region. For example, if portions of an outer jacket of the cable are removed such that the inner jacket will be disposed in the mounting region, then the mounting region radii are selected to substantially match the radii of the inner jacket.

On the other hand, if the outer jacket will be disposed in the mounting region, then the mounting region radii is selected to substantially match the radii of the outer jacket.

Ideally, it is desirable primarily for electrical and mechanical reasons to have the inner diameter of the saddle member mounting regions (e.g. the diameter of the saddle member mounting surfaces in FIG. 1), be larger (but only ever so slightly larger) than the cable outer diameters. For example, in embodiments, the diameter of the saddle member mounting surfaces may be selected such that a press fit tolerance (as defined by ASME Y14.5-2018) exists between the cable and the mounting surfaces. in embodiments, the diameter of the saddle member mounting surfaces may be selected such that a transitional fit, free fit or loose fit tolerance (as defined by ASME Y14.5-2018) exists between the cable and the mounting surfaces. This allows the saddle member to fit without any issues around the cable (i.e. without pinch points that would prevent the cables from entering the saddle) then allows the compression clamps to wrap the saddle member around the cables with high uniformity of surface to surface connection. This is good to distribute the compression load as uniformly as possible the surface of the cable (to avoid mechanical damage to the cable). It also helps ensure that the electrical resistance is as low as possible by increasing (and ideally maximizing) the areas through which the current can flow uniformly (pinch points would create a very large current density with unacceptable heating).

Once the cable is prepared (e.g. by removing an outer jacket) those portions of the cable which will be in contact with the conductive double saddle are cleaned. For example, the cable is cleaned to remove contaminants (including any oxides) from those portions of the cable which will be disposed in (or in contact with) the mounting regions of the conductive saddle 36. This may be accomplished, for example, by rubbing portions of the with an abrasive material (e.g. sanding the jacket) or by lapping the two hemispheres of the cable's jacket that will be in contact with the conductive double saddle. Chemical cleaning processes may also be used in conjunction with or in place of mechanical cleaning techniques such as those described above. This approach increases (an ideally maximizes) surface contact between the cables and a saddle member in which the cables are disposed. Those portions of the cable which will be disposed in (or in contact with) the mounting regions of the conductive saddle may then optionally be plated. Similarly, surfaces 10a, 10b of the mounting regions within the saddle member may also optionally be plated.

Next, a conductive material, which is preferably deformable or malleable at room temperature, is disposed in the mounting surfaces 36 (10a, 10b in FIG. 1). In embodiments, a wire (e.g. an indium wire) may be placed or otherwise disposed in the mounting surfaces 10a, 10b. In embodiments, a continuous length of indium wire is wrapped on a tool designed for the purpose of application of the indium wire to the mounting surfaces of the saddle member. The tool allows a user to create a highly uniform set of parallel lines of indium easily on the tool, and also facilitates transfer of the indium to the copper saddle with high conformity. Furthermore, this approach reduced the amount of handling of the indium wires and ideally results in minimal handling. This creates the series of parallel indium wire lines as shown in FIG. 1 (with the connecting loops just outside the double saddle inner diameter). Due to its physically soft nature, the indium adheres directly to the prepared copper saddle surface. Alternatively, the indium wire may also be wrapped around each conductor in a spiral path with a selected pitch. This method keeps the indium in place during assembly and does not require an additional tool. However, this approach results in an extra amount of indium on the half of the cable not attached to the saddle member.

Next, the superconducting cable is placed in the conductive member. In embodiments, the superconducting cable may be compressed into the conductive double saddle using a compression means such as a clamp or any structure capable of holding the superconducting cable in the mounting surface of the conductive member. In embodiments in which the two HTS cables are compressed into a conductive double saddle, any structure capable of providing up to 50 MPa of pressure to ensure mechanical contact between the cables and double saddle may be used as the compression means. In embodiments, the structure to secure the cables to the mounting surfaces of the conductive member may be an external structure bolted to or about the conductive member. In embodiments, pressure in the range of 25 MPa to 50 MPa may be used. Care should be taken to utilize a pressure which does not result in mechanical damage to a cable or the saddle member.

When the cables are compressed into the mounting regions, the malleable metal deforms to form an interface layer such as that described above in conjunction with FIGS. 1-3 (e.g. interface layer 15 in FIG. 2A). This approach increases, and ideally maximizes, surface area for electrical transfer between the cable and double saddle to minimize electrical resistance.

The cable joint design described herein is simple due, at least in part, to the cables themselves forming the joint interface. Furthermore, in embodiments, the cables 12, 14 (FIG. 1) require only minimal modification (i.e. removal of the outer jacket) and minimal preparation (e.g. cleaning contaminants from the surfaces of the cables which will be disposed on mounting surfaces of the saddle member.

This approach is in strong contrast to other LTS and HTS cables that require relatively large amounts of preparation and precision fabrication time (e.g. on the order of weeks) compared with the cable join approach described herein.

Principal uses of described embodiments are to provide simple, strong, low-resistance, demountable electrical joints (a) between two HTS cables or (b) between an HTS cable and a normal conductor such as a current lead. Furthermore, because the joints are demountable, they also provide the possibility of designing magnets that are fully demountable themselves. Thus, the joint structure and technique described herein facilitates the performance of one or more activities including, but not limited to, inspection, maintenance, repair, and replacement of magnets, as well as innovative design portions for systems that contain magnets.

Embodiments described herein provide several advantages over prior art joints for coupling superconducting cables. In embodiments, cable-to-cable joints between round, copper-jacketed HTS cables are created by compressing the cables on either side of a form-fitting copper saddle. With this approach, only a few very simple and limited processing steps are required to create the joint after the cable is fabricated, including light sanding of the copper jacket (lapping), silver-plating the copper jacket, placing indium wire on the copper jacket, and then compressing the cables around the conductive double saddle with up to 40 MPa of pressure through external clamps. No preparation of the HTS tapes or HTS tape stack beyond the original cable fabrication process is required. And the cable joints are fully demountable and reusable with a minimum amount of personnel effort and tooling. This opens the path to the realistic design and fabrication of HTS magnets that are fully demountable in practice.

Although reference is made herein to particular materials, it is appreciated that other materials having similar functional and/or structural properties may be substituted where appropriate, and that a person having ordinary skill in the art would understand how to select such materials and incorporate them into embodiments of the concepts, techniques, and structures set forth herein without deviating from the scope of those teachings.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal, "top," "bottom," and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A joint, comprising:
   a conductive member comprising a first mounting region and a second mounting region;
   a compression structure that compresses a first conductor into the first mounting region and a second conductor into the second mounting region, wherein within the first mounting region, the first conductor comprises a former having one or more channels provided therein and a high temperature superconductor (HTS) tape stack disposed in at least one of the one or more channels of the former; and
   a malleable metal disposed between a surface of the first conductor and a mounting surface of the first mounting region of the conductive member.

2. The joint of claim 1, wherein the compression structure comprises a clamp.

3. The joint of claim 1, wherein the second conductor comprises a high temperature superconductor tape stack.

4. The joint of claim 1, wherein the malleable metal is disposed on the mounting surface of the first mounting region in the form of two or more malleable metal strips spaced apart such that in response to the first conductor being disposed on the mounting surface of the first mounting region, the two or more malleable metal strips deform to form a continuous, contiguous interface layer between the first conductor and the conductive member.

5. The joint of claim 4, wherein the two or more malleable metal strips comprise indium.

6. The joint of claim 1, wherein the first conductor comprises an inner jacket.

7. The joint of claim 6, further comprising a conductor plated on the inner jacket.

8. The joint of claim 1, wherein the first mounting region is shaped to conform to a shape of the first conductor.

9. The joint of claim 1, wherein the conductive member has a double saddle shape.

10. The joint of claim 1, wherein the first mounting region comprises a recess in the conductive member and the high temperature superconductor tape stack is within the recess.

11. A cable joint comprising:
   a conductive member having a length which defines the length of the joint, the conductive member having a first mounting region having a shape selected to accept a first high temperature superconducting (HTS) cable, a second mounting region having a shape selected to accept a second HTS cable;
   a first HTS cable disposed in the first mounting region of the conductive member, the first HTS cable comprising a former having a plurality of channels and a plurality of high temperature superconductor (HTS) tapes disposed in respective ones of the plurality of channels of the former;
   a second HTS cable disposed in the second mounting region of the conductive member;
   a first interface layer comprised of a malleable metal disposed between a surface of the first mounting region and a surface of the first HTS cable;
   a second interface layer comprised of a malleable metal disposed between a surface of the second mounting region and a surface of the second HTS cable; and
   a malleable metal between the first HTS cable and the conductive member.

12. The cable joint of claim 11 wherein:
   the first HTS cable comprises an inner jacket disposed around the former and the plurality of HTS tapes;
   a conductive plating disposed over at least a portion of a surface of the inner jacket;
   the first and second interface layers are continuous along substantially the entire surfaces of the first and second mounting regions; and
   the first interface layer is disposed between the surface of the first mounting region and at least a portion of the surface of the inner jacket of the first HTS cable over which the conductive plating is disposed.

13. The cable joint of claim 12 further comprising means for holding the first and second HTS cables in the respective first and second mounting regions.

14. The cable joint of claim 13 wherein the first and second interface layers comprise indium and adhere to respective ones of the first and second mounting regions.

* * * * *